(12) United States Patent
Windom

(10) Patent No.: US 10,337,703 B1
(45) Date of Patent: Jul. 2, 2019

(54) QUICK-DISCONNECT FLASHLIGHT

(71) Applicant: Coast Cutlery Co., Portland, OR (US)

(72) Inventor: Gregory David Windom, Portland, OR (US)

(73) Assignee: Coast Cutlery Co., Portland, OR (US)

(*) Notice: Subject to any disclaimer, the term of this patent is extended or adjusted under 35 U.S.C. 154(b) by 0 days.

(21) Appl. No.: 15/927,036

(22) Filed: Mar. 20, 2018

(51) Int. Cl.
| | | |
|---|---|---|
| *F21V 17/00* | (2006.01) | |
| *F21V 17/16* | (2006.01) | |
| *F21V 23/06* | (2006.01) | |
| *F21L 4/02* | (2006.01) | |

(52) U.S. Cl.
CPC ............ *F21V 17/162* (2013.01); *F21L 4/027* (2013.01); *F21V 17/002* (2013.01); *F21V 23/06* (2013.01)

(58) Field of Classification Search
CPC ...... F21V 17/002; F21V 17/162; H02J 50/10; H02J 50/12; F21L 4/005; F21L 4/022; F21L 4/027
See application file for complete search history.

(56) References Cited

U.S. PATENT DOCUMENTS

| 7,387,402 B1* | 6/2008 | Lui (Phillip) | ........... F21L 4/027 362/180 |
|---|---|---|---|
| 2004/0008510 A1* | 1/2004 | Mah | ........ F21L 13/06 362/192 |
| 2009/0212638 A1* | 8/2009 | Johnson | ........... H02J 7/0044 307/104 |
| 2010/0033963 A1* | 2/2010 | Maglica | ........... F21L 4/005 362/208 |
| 2013/0182423 A1* | 7/2013 | Matthews | ............ A45F 5/02 362/191 |
| 2014/0091756 A1* | 4/2014 | Ofstein | ........... H02J 5/005 320/108 |
| 2014/0328054 A1* | 11/2014 | Andersen | ............. F21L 4/00 362/202 |
| 2015/0131276 A1* | 5/2015 | Thompson | ........... F21L 4/025 362/191 |
| 2017/0167669 A1* | 6/2017 | Purkiss | ............ F21L 4/085 |
| 2017/0167706 A1* | 6/2017 | Yang | ............ F21V 23/0428 |

* cited by examiner

*Primary Examiner* — Gerald J Sufleta, II
(74) *Attorney, Agent, or Firm* — Schwabe Williamson & Wyatt P.C.

(57) ABSTRACT

Embodiments are described that provide a flashlight including a head, a lamp and at least one head electrical lead, a first body that is removably connected to the head, the first body including a battery compartment and a first body electrical contact to connect with the head electrical lead, and wherein the head and the first body are removably connected to each other with quick-disconnect coupling means. The flashlight may also include inductive charging coils disposed in the first body to permit the battery to be inductively recharged without being removed from the first body. The flashlight may include a rotatable annular ring for adjusting the flashlight between spot, flood and spot/flood modes utilizing Hall Effect sensors to facilitate the shifting between the modes. Other embodiments may be described and claimed.

18 Claims, 7 Drawing Sheets

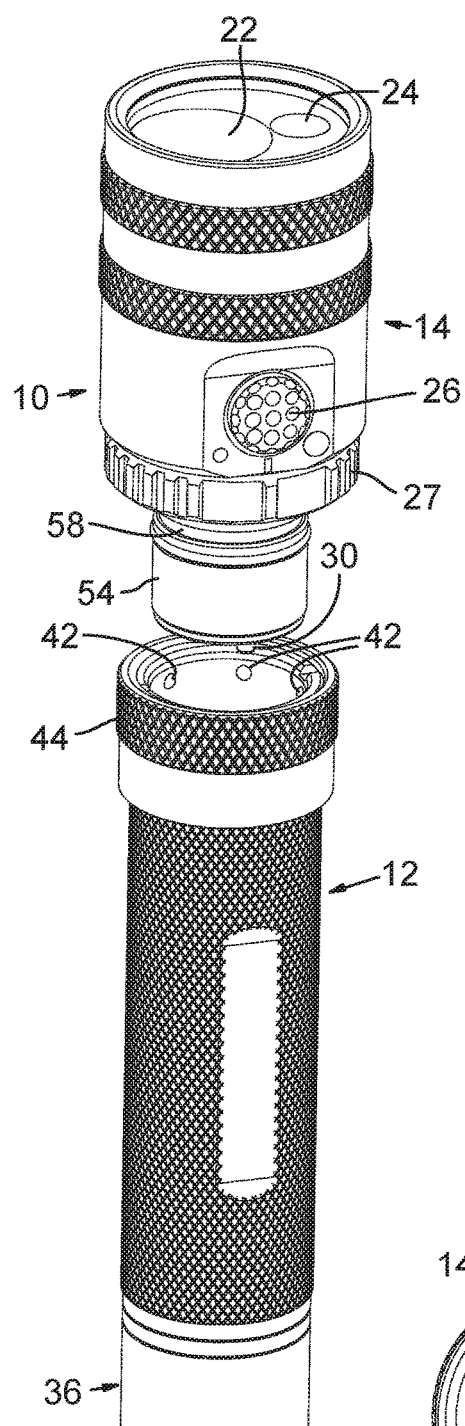
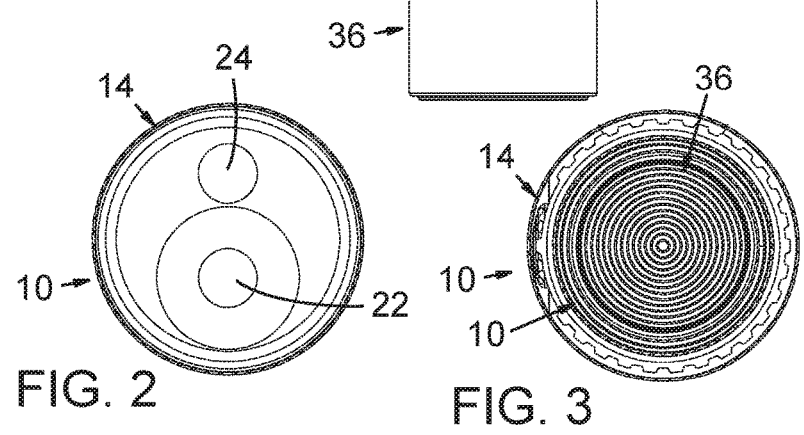
FIG. 1
FIG. 2
FIG. 3
FIG. 4

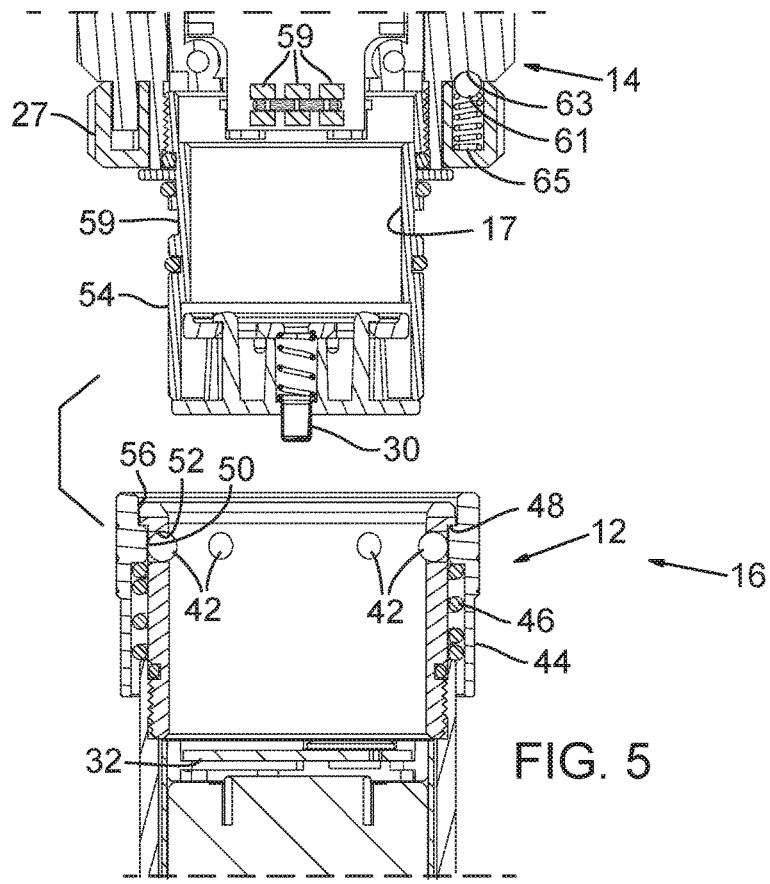
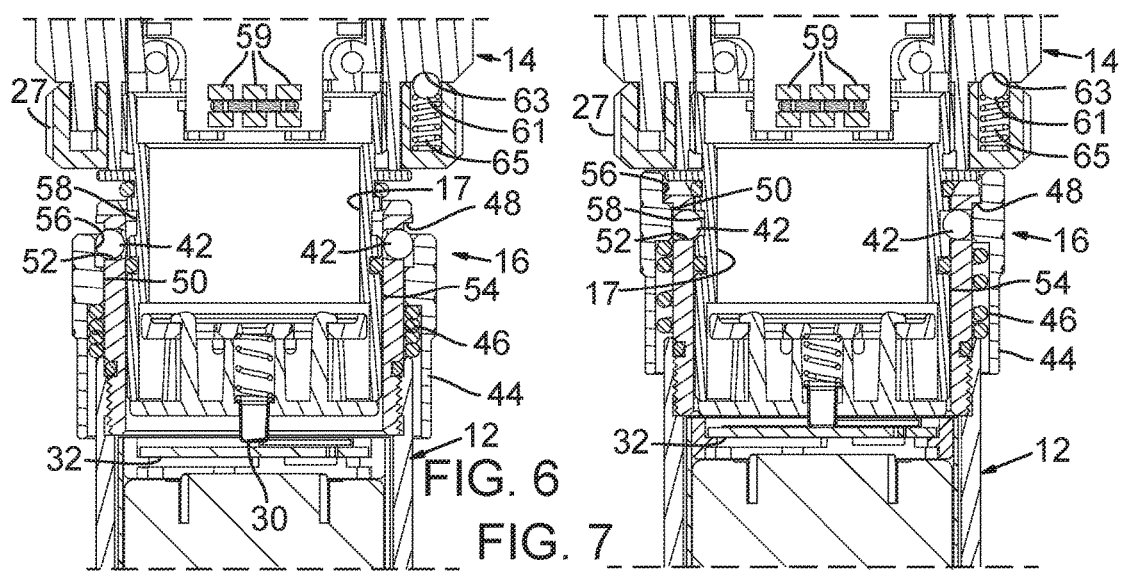

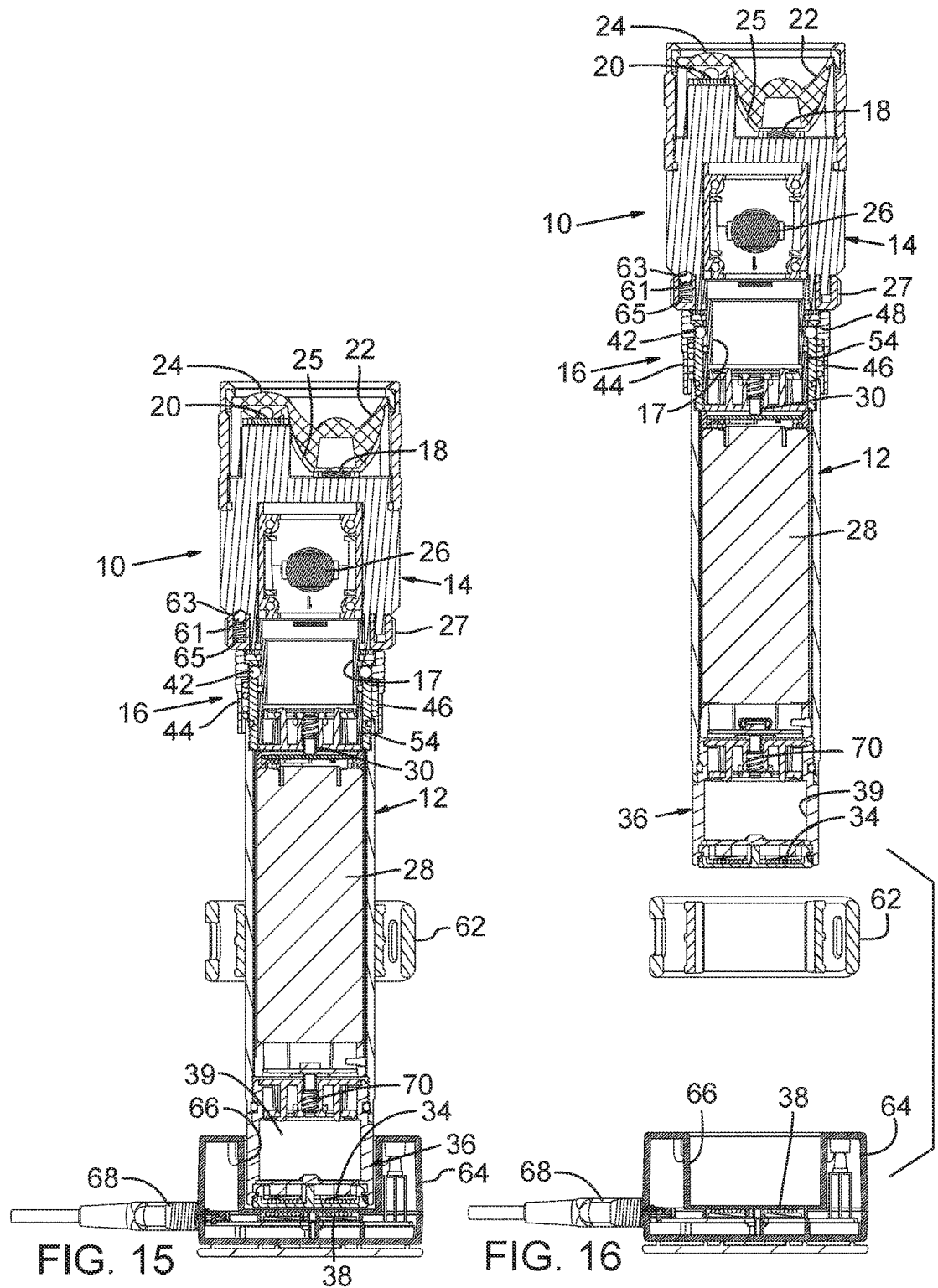

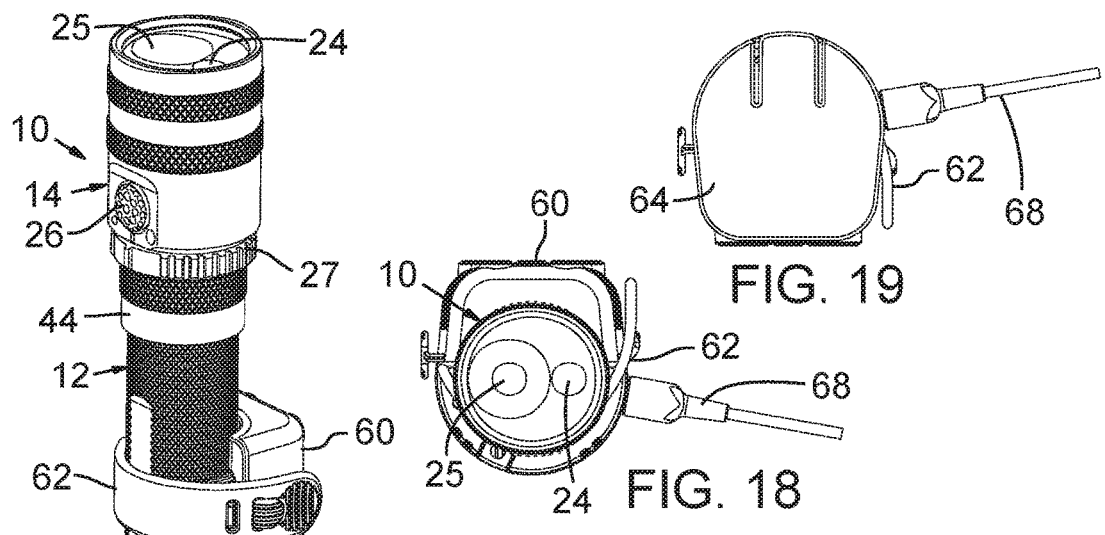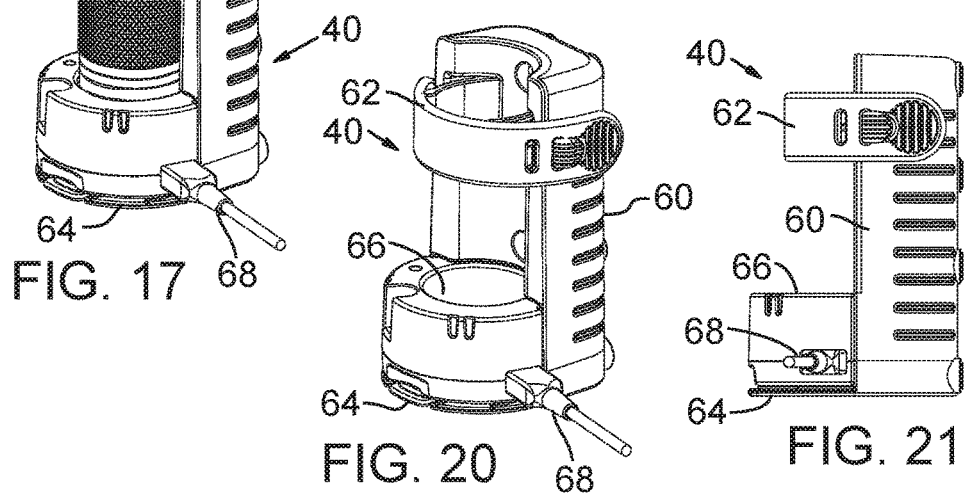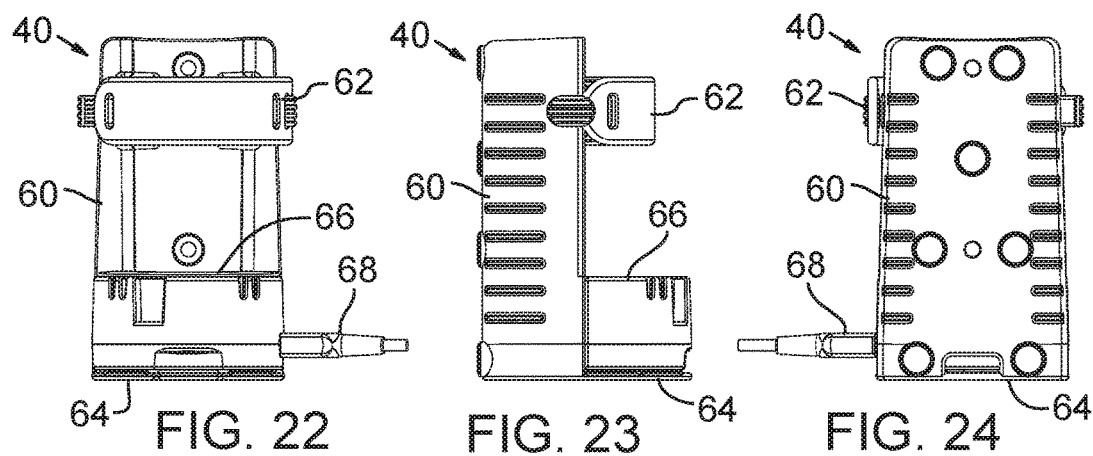

QUICK-DISCONNECT FLASHLIGHT

TECHNICAL FIELD

The present disclosure related generally to the field of flashlights.

BACKGROUND

Flashlights require stored energy to provide illumination. Flashlights contain batteries or battery packs that have one or more powered cells to provide this energy. However, at the end of a long day or shift, workers in construction, law enforcement, firefighting, military, and other fields involving heavy use of flashlights will often run their flashlight's battery power down to a level that is insufficient to provide enough light.

Rechargeable batteries have come on the market in recent years that permit batteries to be recharged during downtime. To accommodate such users, some rechargeable flashlights come with two rechargeable cells and an alkaline pack. However, even with these extra sources of power, the user must unscrew the tailcap of the flashlight, remove the discharged battery, insert a fresh battery, and then screw the tailcap back into place. The replacement operation can be difficult to perform while in the middle of a shift or a law enforcement event, or in a firefighting or military operation, particularly since it will often have to be performed in the dark, sometimes in wet, cold or otherwise-foul conditions. Moreover, the user may be wearing gloves, which can further exacerbate the problems inherent in the handling of a flashlight under adverse conditions.

BRIEF DESCRIPTION OF THE DRAWINGS

Embodiments will be readily understood by the following detailed description in conjunction with the accompanying drawings and the appended claims. Embodiments are illustrated by way of example and not by way of limitation in the figures of the accompanying drawings.

FIG. 1 is a perspective view of a first embodiment, with the head of the flashlight disengaged from the body;

FIG. 2 is an end elevation view from the front of the embodiment of FIG. 1;

FIG. 3 is an end elevation view from the rear of the embodiment of FIG. 1;

FIG. 4 is a side elevation view corresponding to FIG. 1 except that the head is engaged with the body;

FIG. 5 is a fragmentary, enlarged, side elevation sectional view of the embodiment of FIG. 1 showing the engagement system, with the head disengaged from the body;

FIG. 6 is a fragmentary, enlarged, side elevation sectional view of the embodiment of FIG. 1 showing the engagement system, with the head partially engaged with the body and the sleeve retracted;

FIG. 7 is a fragmentary, enlarged, side elevation sectional view of the embodiment of FIG. 1 showing the engagement system, with the sleeve in its forward position and the head fully engaged with the body;

FIG. 15 is a side elevation sectional view corresponding to FIG. 11 except that it includes a first embodiment of a charging station in which the flashlight is mounted;

FIG. 16 is a side elevation sectional view corresponding to FIG. 15 except that the flashlight is shown removed from the first embodiment of the charging station;

FIG. 17 is a perspective view showing the embodiment of FIG. 1 mounted to the first embodiment of the charging station;

FIG. 18 is an end elevation view of the embodiment of FIG. 17 from the top;

FIG. 19 is an end elevation view of the embodiment of FIG. 17 from the bottom;

FIG. 20 is a perspective view of the first embodiment of the charging stand with the flashlight removed;

FIG. 21 is a side elevation view of the first embodiment of the charging stand with the flashlight removed, from the right side;

FIG. 22 is a front elevation view of the first embodiment of the charging stand with the flashlight removed;

FIG. 23 is a side elevation view of the first embodiment of the charging stand with the flashlight removed, from the left side;

FIG. 24 is a rear elevation view of the first embodiment of the charging stand with the flashlight removed;

DETAILED DESCRIPTION

Figure 8:
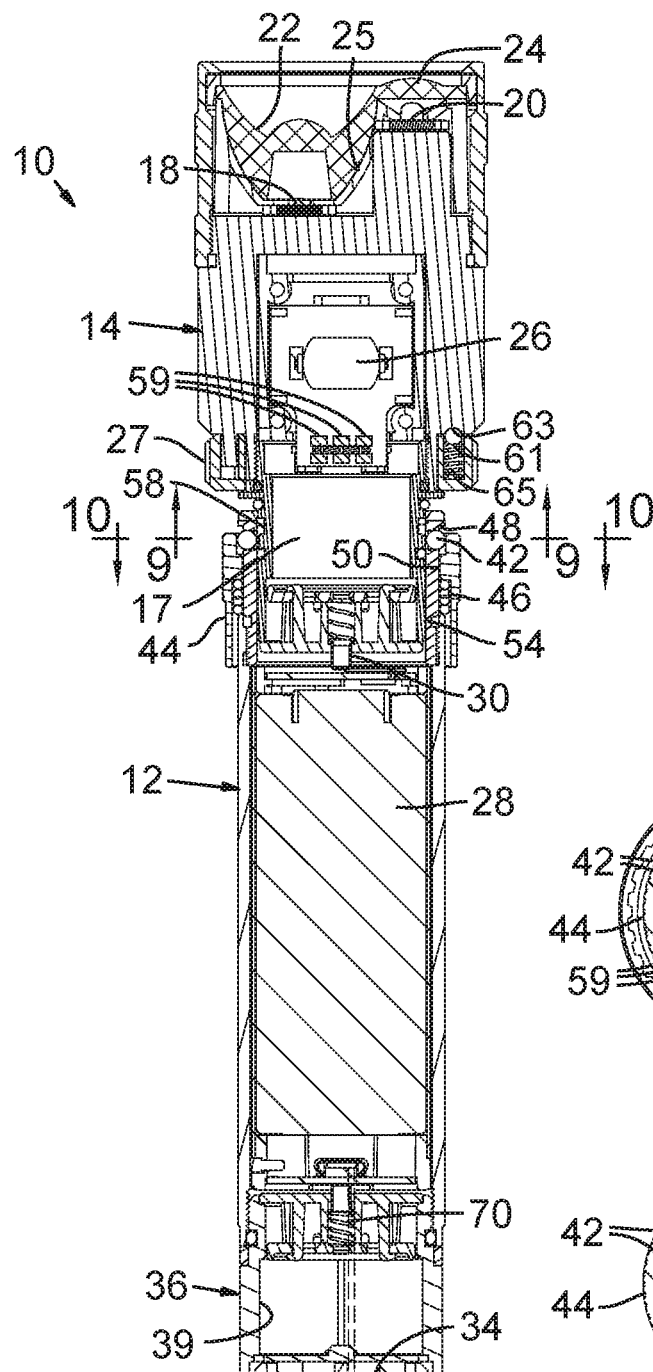
FIG. 8 is side elevation, sectional view of the embodiment of FIG. 1 with the head engaged with the body.
Figure 9:
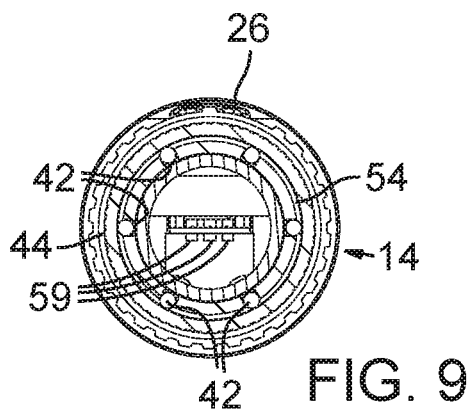
FIG. 9 is an end elevation sectional view taken along line 9-9 of FIG. 8.
Figure 10:
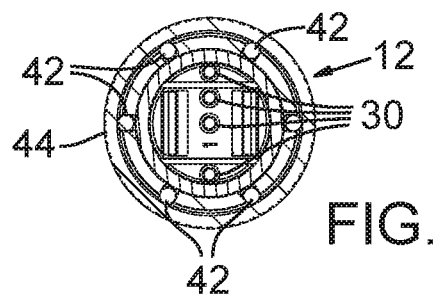
FIG. 10 is an end elevation sectional view taken along line 10-10 of FIG. 8.
Figure 11:
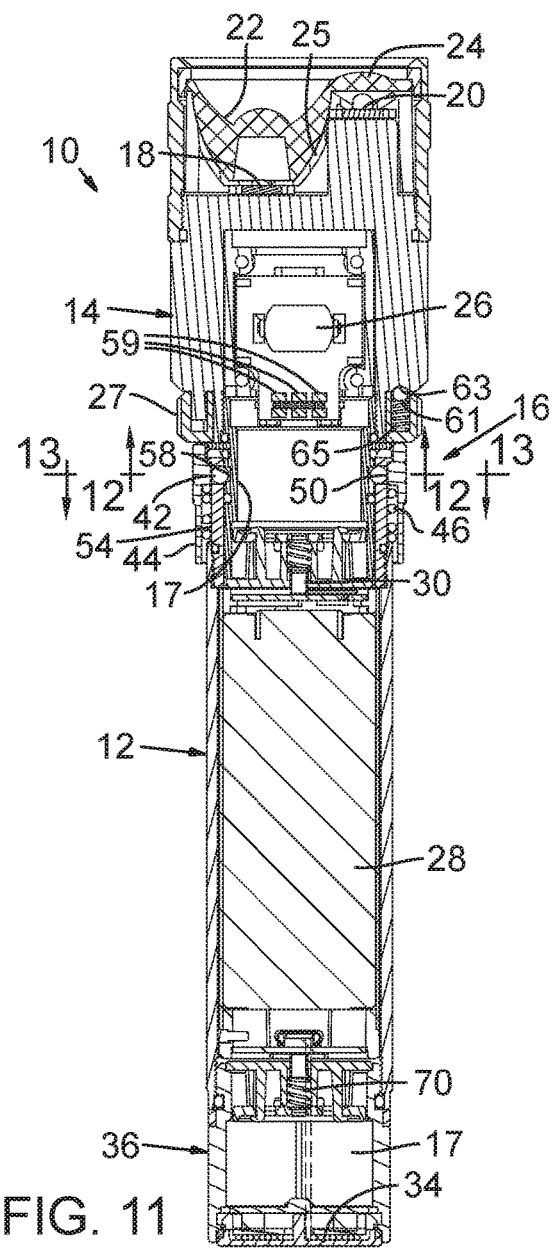
FIG. 11 is a side elevation sectional view of the embodiment of FIG. 1 with the head engaged with the body.
Figure 14:
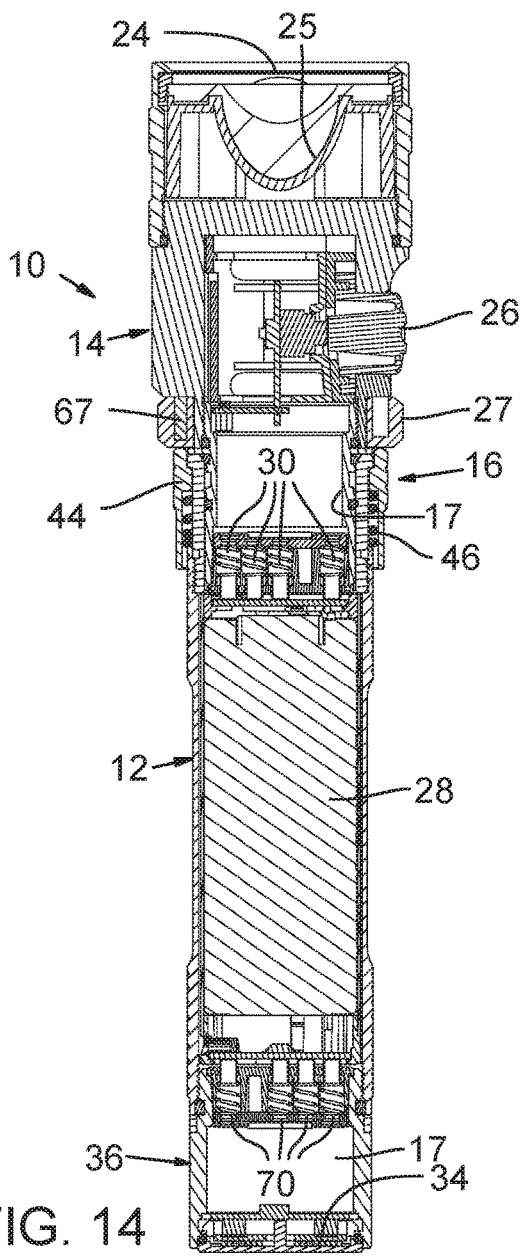
FIG. 14 is a side elevation sectional view of the embodiment of FIG. 1 with the head engaged with the body, with the section offset by 90 degrees from the sectional view of FIG. 11.
Figure 12:
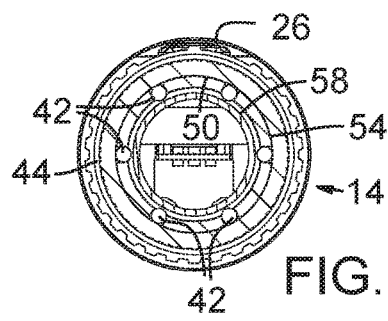
FIG. 12 is an end elevation sectional view taken along line 12-12 of FIG. 11.
Figure 13:
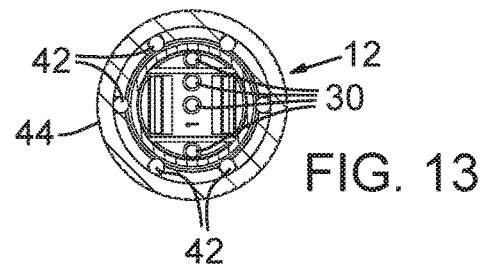
FIG. 13 is an end elevation sectional view taken along line 13-13 of FIG. 11.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous, and are generally intended as "open" terms (e.g., the term "including" should be interpreted as "including but not limited to," the term "having" should be interpreted as "having at least," the term "includes" should be interpreted as "includes but is not limited to," etc.).

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

The described emodiments may include a flashlight comprising a head having a lamp and at least one head electrical lead, a first body that is removably connected to the head, the first body including a battery compartment and a first body electrical contact to connect with the head electrical lead, and wherein the head and the first body are removably connected to each other with quick-disconnect coupling means.

The flashlight may also include a second body that may be connected to the head in place of the first body, the second body including a second battery compartment and a second body electrical contact to connect with the head electrical lead, and wherein the head and the second body are removably connected to each other with the quick-disconnect coupling means.

The flashlight may further include a rechargeable battery and a charging stand for recharging the battery.

A rotatable annular ring may be provided for adjusting the flashlight between spot, flood and spot/flood modes. The annular ring may have a magnet therein to cooperate with Hall Effect sensors to facilitate shifting between the modes.

The flashlight may also include inductive charging coils disposed in the first body to permit the battery to be inductively recharged without being removed from the first body.

Another way to describe the depicted embodiments is as a rechargeable flashlight system comprising a flashlight having a head, including a lamp and at least one electrical lead, a first body that is removably connected to the head, the first body including a battery compartment and an electrical contact to connect with the electrical lead in the head. In this embodiment the head and the first body may be removably connected to each other with a first a quick-disconnect coupling including a first sleeve that is slidably mounted to the first body, the first sleeve having a variety of inwardly-facing surfaces at various heights designed to control the position of a plurality of hardened balls with respect to at least one orifice in the first body and at least one aperture in the head, the at least one orifice and the at least one aperture serving to engage and disengage the first body from the head, while simultaneously connecting the lamp electrical lead and the first body electrical contact.

A second body may be removably connected to the head in place of the first body, the second body including a second battery compartment and a second electrical contact to connect with the electrical lead in the head. In this embodiment, the head and the second body may be removably connected to each other with a second quick disconnect coupling including a second sleeve that is slidably mounted to the second body, the second sleeve having a variety of second inwardly-facing surfaces at various heights designed to control the position of a plurality of second hardened balls with respect to the at least one orifice in the second body and the at least one aperture in the head, the at least one orifice in the second body and the at least one aperture serving to engage and disengage the second body from the head, while simultaneously connecting the lamp electrical lead and the second body electrical contact.

An inductive charging stand may also be included that comprises primary inductive coils designed to alternatively cooperate with secondary inductive coils disposed in each of the first and second bodies when one or both of the bodies are positioned in close proximity to the inductive charging stand to inductively recharge batteries that may be disposed in the first or second bodies.

Another way to describe the disclosed embodiments is as a flashlight including the following components: a head, including a lamp and at least one head electrical lead; a body that is removably connected to the head, the body including a battery compartment and a body electrical contact to connect with the at least one electrical lead; wherein the head and the body are removably connected to each other with a quick-disconnect coupling including a sleeve having a variety of surfaces designed to control the position of a plurality of hardened members serving to engage and disengage the body from the head, while simultaneously connecting the lamp electrical lead and the body electrical contact.

The disclosed embodiments also provide a flashlight having a head, including a lamp and at least one head electrical lead; and a first body that is removably connected to the head, the body including a battery compartment and a first body electrical contact to connect with the at least one electrical lead. In this embodiment the head and the first body are removably connected to each other with a quick-disconnect coupling including a first sleeve that is slidably mounted to the first body, the first sleeve having a variety of inwardly-facing surfaces at various heights designed to control a position of a plurality of hardened members with respect to at least one orifice in the first body and at least one aperture in the head, the at least one orifice and the at least one aperture serving to engage and disengage the first body from the head, while simultaneously connecting the lamp electrical lead and the first body electrical contact.

FIGS. 1-14 best depict a preferred embodiment of a flashlight 10, which includes a body 12 and a head 14 that may be quickly disengaged from each other using a quick-disconnect coupling, indicated generally at 16. Other than the quick-disconnect feature, and the Hall Effect focus feature and inductive charging capability discussed below, flashlight 10 is largely conventional in design. It includes two LEDs 18 and 20. The larger LED 18 may include a compound concave/convex lens 22, while the smaller LED 20 may include a generally convex lens 24. Lenses 22 and 24 may be formed from one piece of plastic such as shown in the figures but they may also be formed from two different pieces of any type of material conventionally used for flashlight lenses. A holder 21 may be provided to support lenses 22 and 24. Holder 21 may also function as a reflector. This portion of the head, including the LEDs, lenses and holder will sometimes be referred to below as the "lamp."

On/off switch 26 may include a printed circuit board assembly 29. When body 12 is connected to head 14, power is transmitted from a battery 28 to LEDs 18 and 20 via conventional circuitry and contacts such as spring-loaded leads 30, which contact battery 28 either directly or via a contact plate 32. In the depicted embodiment, four leads 30 are included to provide positive and negative contacts with contact plate 32 and in turn battery 28 in a conventional manner.

Battery 28 may take the form of conventional D batteries (not shown) but the preferred batteries would be in the form of a rechargeable battery pack. Body 12 of flashlight 10 may include secondary inductive charging coils 34 in a tailcap 36. Secondary induction charging coils 34 would typically interact with primary induction charging coils 38 in an induction charging pad or stand 40, to be described below. A space 39 may be provided for future installation of electronics and other hardware to permit the inclusion of other features.

Quick-disconnect coupling 16 is best shown in FIGS. 5-7. Coupling 16 is similar to steel ball connect/disconnect systems sometimes used in air hoses and other applications and will sometimes be described herein as quick-disconnect coupling means. A space 17 may be provided in the rear of the head to provide adequate length for the coupling. Coupling 16 may include six hardened balls such as the steel balls shown at 42 in FIGS. 1 and 5. A sleeve 44 is slidably mounted to body 12 and is forwardly biased by a sleeve spring 46. Sleeve 44 includes a variety of inwardly-facing surfaces at various heights designed to control the position of balls 42 with respect to a plurality of orifices and grooves, which will sometimes be referred to collectively as openings. The sleeve, surfaces and openings serve to removably engage and disengage body 12 and head 14, while simultaneously connecting the lamp electrical leads to battery 28, as described below.

FIG. 5 shows how the forwardly-biased sleeve 44 is in abutment with shoulder 48 when in its forward-most position. In this position, a raised annular abutment 50 maintains a plurality of balls 42 in orifices 52. Six orifices and balls are shown in the figures but more or fewer might alternatively be utilized. Spring 46 is shown to be fully extended when sleeve 44 is in this forward position.

In order to engage body 12 with head 14, sleeve 44 is first retracted to the position depicted in FIG. 6, which fully compresses sleeve spring 46 in its seat, and blocks the sleeve from being retracted farther. With sleeve 44 retracted, balls 42 are pushed radially outwardly by an outer surface 54 of the rear portion of head 14. This radial outward movement is facilitated because, with the sleeve retracted, raised annular abutment 50 no longer holds balls 42 in their innermost position, as they are able to move outward until they contact an annular surface 56 of sleeve 44.

With sleeve 44 still in its retracted position, body 12 and head 14 are pushed into a full engagement position. Sleeve 44 is then released or pushed forward if necessary to the position shown in FIG. 7, with raised annular abutment 50 forcing balls 42 into an aperture, shown in the depicted embodiment as an annular groove 58 in outer surface 54 of head 14. Alternatively, this aperture may be in the form of a plurality of apertures to receive balls 42. However, including annular groove 58 is preferable so that body 12 and head 14 do not need to be aligned in any particular disposition. In any event, this fully engages the body and the head. In this position, leads 30 are in electrical contact with battery 28 to provide power to LEDs 18 and 20. Orifices 52 and annular groove 58 will sometimes be referred to herein as a plurality of openings.

To disengage head 14 from body 12, sleeve 44 is retracted to the position shown in FIG. 6. As this is done, outer surface of the rear portion of head 14 pushes balls 12 out of orifices 52, which is permitted because raised annular abutment 50 has cleared the steel balls, which permits the balls to move up against annular surface 56 of sleeve 44. At this point, body 12 may simply be withdrawn from head 14 to the position shown in FIG. 5.

In the previously-described quick-disconnect system 16, sleeve 44 is mounted to body 12, although it should be understood that a similar quick-disconnect system might position the sleeve on the head with the aperture or annular groove 58 positioned in the body.

The big advantage of being able to remove head 14 from body 12 is that when the battery power is exhausted, another body, containing a fresh battery or batteries can be quickly put in place. This permits the user to immediately move on to the next task without having to unscrew the head, remove the spent battery, find one or more fully-charged replacement batteries, replace those batteries in the body while making sure the ends are in the correct positions, and then screwing the head back onto the body. As noted earlier, this often needs to be done under adverse conditions, in the dark, and while wearing gloves.

Flashlight 10 may include an annular ring 27 to permit the operator to easily shift between flood, spot and flood/spot modes. This capability may be facilitated through the use of three Hall Effect sensors 59, with a magnet 67 that is embedded in annular ring 27 adjacent the Hall Effect sensors (See FIG. 14). As annular ring 27 is rotated, the magnet/Hall Effect sensors switch between flood, spot and flood/spot focus modes. Additional Hall Effect sensors may be added to provide additional options, such as different color lights.

If this Hall Effect adjustment feature is included, a detent mechanism is typically employed. In the depicted flashlight 10, annular ring 27 includes a focus adjustment ball 61, which is biased away from the annular ring by a spring 65. As annular ring 27 is rotated, focus adjustment ball 61 can alternatively fit into one of three semi-spherical depressions, one of which is depicted at 63 in FIGS. 5-7. When annular ring 27 is further rotated to transition into another focus mode, focus adjustment ball 61 is simply depressed into a depression (not shown) in the annular ring against the bias of spring 65, until it reaches the next depression 63. At that point, the operator will know the next setting (flood, spot or flood/spot) has been reached. A third setting can be reached by continuing to rotate annular ring 27. Typically, no more than about 20 degrees of rotation is required between each of the three modes.

The system of the preferred embodiments is particularly well adapted to be used with rechargeable batteries or battery pack. This is because, while the one body is in use, the other body may be charged. Charging is particularly easy when used with an induction charging system although the system may be used with non-rechargeable batteries or with a conventional plug in recharger.

An induction charging capability is included in the depicted embodiment. As noted earlier, body 12 may include secondary induction charging coils 34 in its tailcap 36. These secondary induction charging coils 34 typically interact with primary induction charging coils 38 in an induction charging stand 40 through electromagnetic induction. With flashlight 10 in position on charging stand 40, the two sets of induction coils 34 and 38 are in close enough proximity that a charge is induced from the charging stand into battery 28 via spring loaded charging leads 70. A charging stand frame 60 with a strap 62 may be included to ensure that the body 12 is properly positioned in the charging stand. Strap 62 may be biased by a spring 63 to ensure that the flashlight is securely held in place in the charging stand.

Some applications may not require any more than a base such as that shown at 64 as long as something like an annular wall 66 is included to stabilize the body in the charging stand. While strap 62 is shown in the figures, a pair of flexible arms (not shown) may instead be provided to secure the body in position in the charging stand. Charging stand 40 is also provided with a power cord 68 to provide electrical power for primary induction coils 38.

Figure 25:
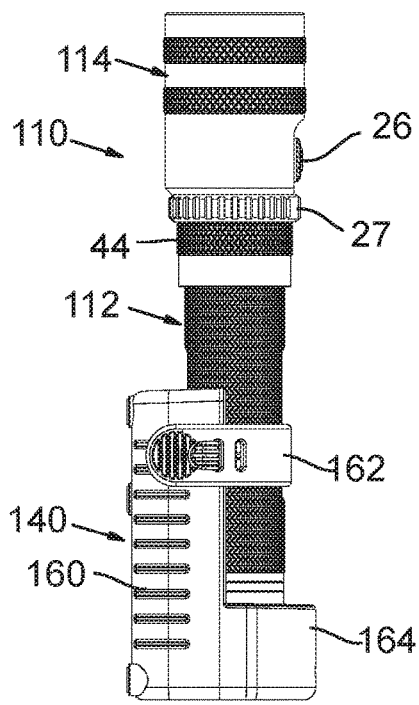
FIG. 25 is a side elevation view of a second embodiment of a charging stand with two flashlights mounted (only one of which shows in this Figure)
Figure 26:
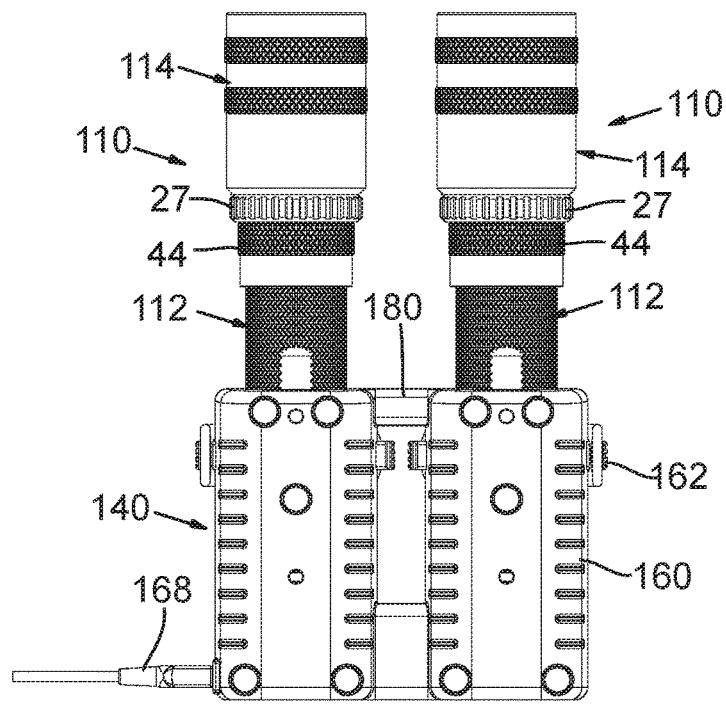
FIG. 26 is a rear elevation view of the second embodiment of the charging stand with two flashlights mounted.
Figure 27:
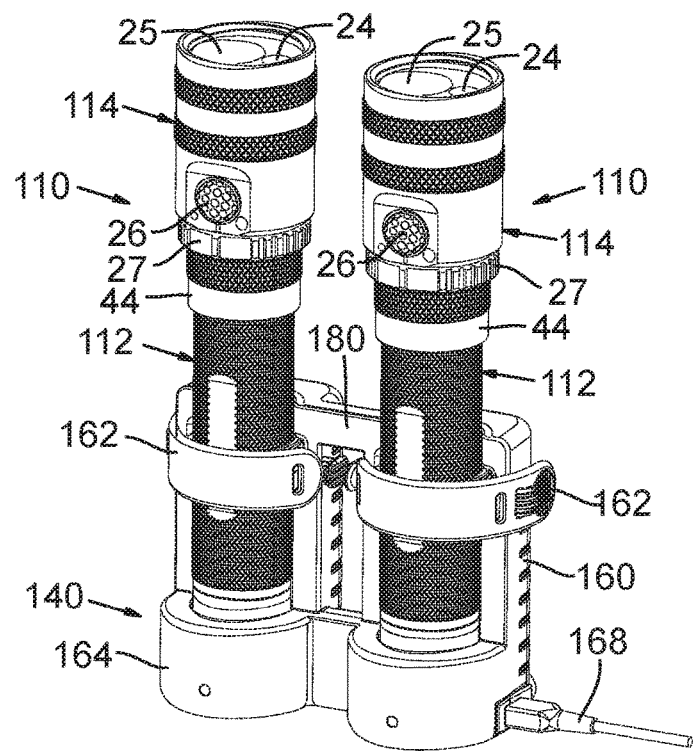
FIG. 27 is a perspective view of the second embodiment of the charging station with two flashlights mounted.

FIGS. 25-27 depict an alternate embodiment of charging stand 40, and is therefore identified with the numeral 140. Charging stand 140 may be identical to charging stand 40 except that it includes positions for two flashlights mounted in tandem. Therefore, charging stand 140 may include two bases 164 with annular walls 166, two frames 160 and two straps 162, mounted together with a web 180 extending between them. It is only necessary to include a single power cord 168, as the two portions of stand 140 may be electrically connected to each other.

FIGS. 15-18 and 25-27 show the entire flashlight, head and all, in position in charging stand 40 or 140, it should be understood that a principal advantage of the described embodiments is that it is only necessary for the body 12 to be positioned for charging.

The previously-described embodiments include for inductive charging. However, it should be understood that an alternate embodiment of flashlight 10 might not include the inductive charging feature. The exterior of that alternate embodiment might not look different from that of flashlight 10, so FIGS. 1-4 should be considered to depict this alternate embodiment as well as the one with inductive charging. The alternate embodiment could utilize rechargeable batteries that are removed from the flashlight for recharging, or could simply include standard non-rechargeable batteries.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

The invention claimed is:

1. A flashlight comprising:
a head, including a lamp and at least one head electrical lead;
a first body that is removably connected to the head, the body including a battery compartment and a first body electrical contact to connect with the at least one electrical lead; and
wherein the head and the first body are removably connected to each other with quick-disconnect coupling means.

2. The flashlight of claim 1, further comprising a second body that may be connected to the head in place of the first body, the second body including a second battery compartment and a second body electrical contact to connect with the at least one electrical lead; and
wherein the head and the second body are removably connected to each other with second quick-disconnect coupling means.

3. A flashlight comprising:
a head, including a lamp electrical lead and at least one head electrical lead;
a first body that is removably connected to the head, the body including a battery compartment and a first body electrical contact to connect with the at least one electrical head;
wherein the head and the first body are removably connected to each other with a first quick-disconnect coupling including a first sleeve that is slidably mounted to the first body, the first sleeve having a variety of inwardly-facing surfaces at various heights designed to control a position of a plurality of hardened balls with respect to at least one orifice in the first body and at least one aperture in the head, the at least one orifice and the at least one aperture serving to engage and disengage the first body from the head, while simultaneously connecting the lamp electrical lead and the first body electrical contact.

4. The flashlight of claim 3, further comprising a second body that may be connected to the head in place of the first body, the second body including a second battery compartment and a second body electrical contact to connect with the at least one electrical head;
wherein the head and the second body are removably connected to each other with a second quick-disconnect coupling including a second sleeve that is slidably mounted to the second body, the second sleeve having a variety of inwardly-facing surfaces at various heights designed to control a position of a plurality of hardened balls with respect to at least one orifice in the second body and at least one aperture in the head, the at least one orifice and the at least one aperture serving to engage and disengage the second body from the head, while simultaneously connecting the lamp electrical lead and the second body electrical contact.

5. The flashlight of claim 3, further comprising at least one battery mounted into the battery compartment of the first body.

6. The flashlight of claim 5, wherein the at least one battery is a rechargeable battery.

7. The flashlight of claim 6, further comprising a charging stand for recharging the at least one battery.

8. The flashlight of claim 3, further comprising a rotatable annular ring for adjusting the flashlight between spot, flood and spot/flood modes.

9. The flashlight of claim 8 wherein the annular ring includes a magnet that cooperates with Hall Effect sensors to facilitate the shifting between spot, flood and spot/flood modes.

10. The flashlight of claim 8, further comprising detent means for permitting an operator to sense when the annular ring has been rotated sufficiently to shift between the modes.

11. The flashlight of claim 3, further comprising first inductive charging coils disposed in the first body to permit the battery to be inductively recharged without being removed from the first body.

12. A rechargeable flashlight system comprising:
a flashlight having a head, including a lamp electrical lead and at least one electrical lead;
a first body that is removably connected to the head, the body including a battery compartment and an electrical contact to connect with the at least one electrical lead in the head;
wherein the head and the first body are removably connected to each other with a first quick disconnect coupling including a sleeve that is slidably mounted to the first body, the sleeve having a variety of inwardly-facing surfaces at various heights designed to control a position of a plurality of hardened balls with respect to at least one orifice in the first body and at least one aperture in the head, the at least one orifice and the at least one aperture serving to engage and disengage the body from the head, while simultaneously connecting the lamp electrical lead and the body electrical contact; and
an inductive charging stand comprising primary inductive coils designed to alternatively cooperate with secondary inductive coils disposed in the first body when the body is positioned in close proximity to the inductive charging stand to inductively recharge batteries when the batteries are disposed in the first body.

13. The rechargeable flashlight system, further comprising:
a second body that may be removably connected to the head in place of the first body, the second body including a second battery compartment and a second body electrical contact to connect with the at least one electrical lead in the head;
wherein the head and the second body are removably connected to each other with a second quick disconnect coupling including a second sleeve that is slidably mounted to the second body, the second sleeve having a variety of second inwardly-facing surfaces at various heights designed to control a position of a plurality of second hardened balls with respect to the at least one orifice in the second body and the at least one aperture in the head, the at least one orifice in the second body and the at least one aperture serving to engage and disengage the second body from the head, while simultaneously connecting the lamp electrical lead and the second body electrical contact.

14. The rechargeable flashlight system of claim 12, further comprising a system for shifting between spot, flood and spot/flood modes including Hall Effect sensors to facilitate the shifting between the modes.

15. The rechargeable flashlight of claim 14 wherein the system for shifting between spot, flood and spot/flood modes includes a rotatable annular ring having a magnet therein for cooperating with the Hall Effect sensors to shift the flashlight between the modes.

16. The rechargeable flashlight of claim 15, further comprising detent means for permitting an operator to sense when the annular ring has been rotated sufficiently to shift between the modes.

17. A flashlight comprising:
a head, including a lamp and at least one head electrical lead;
a body that is removably connected to the head, the body including a battery compartment and a body electrical contact to connect with the at least one electrical lead; and
wherein the head and the body are removably connected to each other with a quick-disconnect coupling including a sleeve having a variety of surfaces designed to control a position of a plurality of hardened members serving to engage and disengage the body from the head, while simultaneously connecting the lamp electrical lead and the body electrical contact.

18. A flashlight comprising:
a head, including a lamp and at least one head electrical lead;
a first body that is removably connected to the head, the body including a battery compartment and a first body electrical contact to connect with the at least one electrical lead; and
wherein the head and the first body are removably connected to each other with a quick-disconnect coupling including a first sleeve that is slidably mounted to the first body, the first sleeve having a variety of inwardly-facing surfaces at various heights designed to control a position of a plurality of hardened members with respect to at least one orifice in the first body and at least one aperture in the head, the at least one orifice and the at least one aperture serving to engage and disengage the first body from the head, while simultaneously connecting the lamp electrical lead and the first body electrical contact.

* * * * *